United States Patent [19]
Aude

[11] 4,230,137
[45] Oct. 28, 1980

[54] APPARATUS AND METHOD FOR SLACK FLOW ELIMINATION IN A SLURRY PIPELINE

[75] Inventor: Thomas C. Aude, Orinda, Calif.

[73] Assignee: Bechtel International Corporation, San Francisco, Calif.

[21] Appl. No.: 899,429

[22] Filed: Apr. 24, 1978

[51] Int. Cl.[3] .......... G05D 7/03
[52] U.S. Cl. .......... 137/8; 137/236 R; 137/487.5
[58] Field of Search .......... 137/8, 236, 487.5

[56] References Cited

U.S. PATENT DOCUMENTS 3,805,817 12/1971 Smith .......... 137/8

*Primary Examiner*—Robert G. Nilson
*Attorney, Agent, or Firm*—Townsend and Townsend

[57] ABSTRACT

A method and apparatus for protecting against the abrasion of pipe walls in a slurry pipeline caused by slack flow when the pipeline is operated in the batch mode, i.e., when one or more water batches and one or more slurry batches are transported through a pipeline. Pressure transducers sense the pressure at each relatively high point of the pipeline as an interface between a water batch and a following slurry batch passes that point. When one of the sensed pressures falls below a predetermined low value of pressure, a control device actuates valves to divert the flow downstream in the pipeline through a staged choke containing flow restrictors, thus raising the fluid pressure in the water batch which then counteracts the effect of the static head of the slurry batch. The flow is redirected away from the staged choke when one of the sensed pressures exceeds a predetermined high value of pressure, thus lowering the fluid pressure and preventing pipe wall overpressure.

17 Claims, 5 Drawing Figures

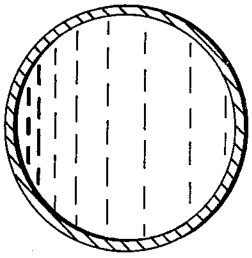
FIG.__4.
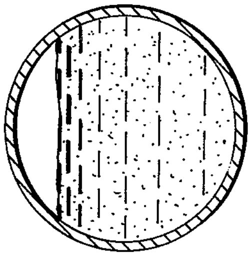
FIG.__3.
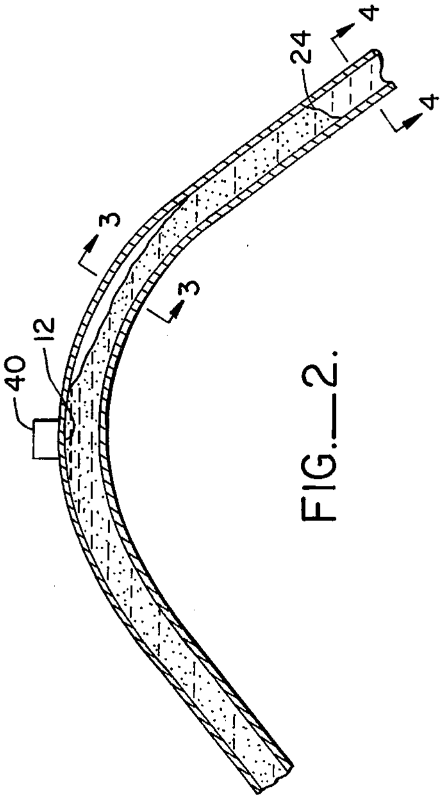
FIG.__2.
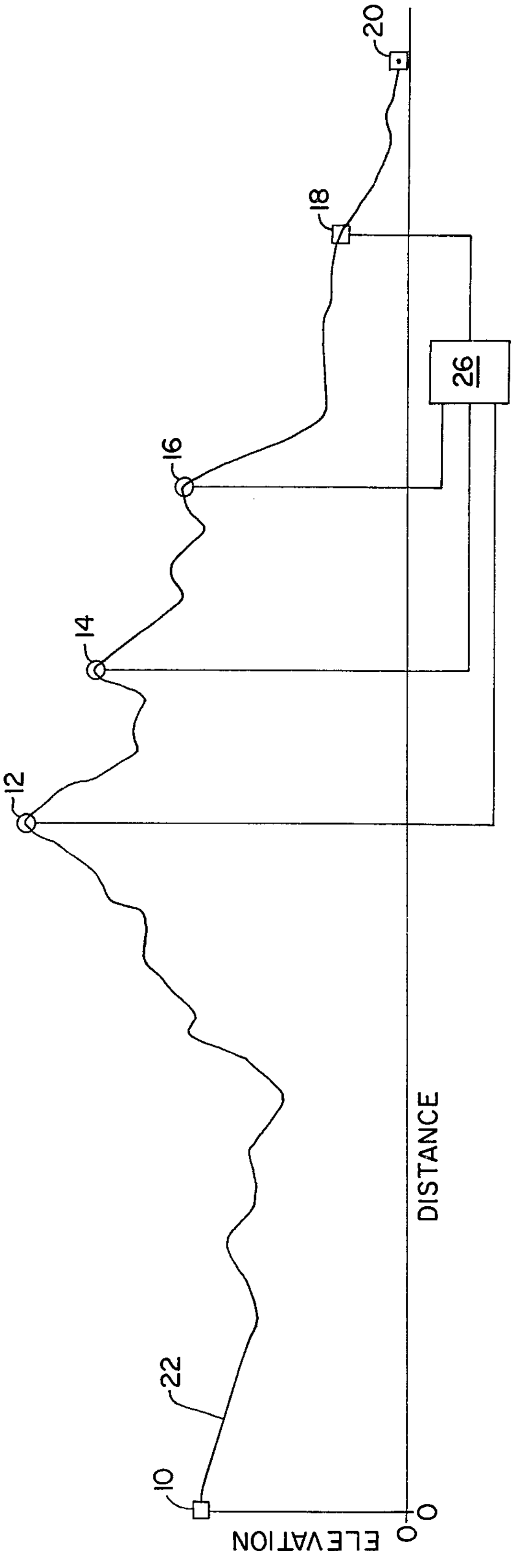
FIG.__1.

APPARATUS AND METHOD FOR SLACK FLOW ELIMINATION IN A SLURRY PIPELINE

BACKGROUND OF THE INVENTION

This invention relates to slurry pipeline systems for transporting liquids containing solid or non-liquid materials. More specifically, this invention relates to the construction and operation of pipelines so that a pipeline will be capable of operating at below its design capacity without damaging the pipeline.

Pipelines are presently in wide use for transporting a variety of liquids, most commonly for transporting fossil fuels and gases. Pipelines are also used for transporting solids in the form of slurries in which fine solid particles are suspended in a carrier liquid, usually water. In the past slurry pipelines normally extended over relatively short distances.

No insurmountable problems are encountered when such a slurry pipeline extends over long distances and hilly terrain so long as it is operated at or near its design capacity.

Typically, slurry pipelines connect a mine or another bulk producing facility with a shipping terminal, a factory, or another user of the bulk material. Because of significant lead times, normally several years, between the initial start-up of the mine and/or the shipping terminal, factory, etc. and their full capacity operation, it is normally not possible to immediately operate the pipeline at or near its design capacity due to the lack of material required for full operation.

As the flow in slurry pipelines cannot normally be stopped because the suspended particles would then settle out and partially or fully plug up the pipeline, it is necessary to maintain a continuous flow in the pipeline. The pipeline must therefore be full of liquid and/or slurry material at all times. During below-capacity operation, this is usually accomplished by batching the slurry with another liquid, normally water, so that the pipeline is operated for a number of hours, say 40 hours, with the slurry, and thereafter for a number of hours, say 20 hours, with water.

It has been determined that this batch operation of the pipeline can be troublesome if the pipeline extends over hilly terrain and the slurry and the other liquid (hereinafter "water") have differing specific gravities. Normally, both conditions are encountered because overland pipelines almost always extend over varying elevations and because the slurries are normally a mixture of water and a solid, say coal or ore, which increases the specific gravity of the slurry over that of plain water by a factor of as much as 2. The word "liquid" as used hereinafter is meant to include not only "pure" liquid, such as water, but also liquid in which solid material is suspended, e.g., slurry. Thus, a reference to a pipeline carrying batches of slurry and water is equivalent to a reference to a pipeline carrying batches of different liquids or liquid materials.

As a result, when the interface between a downstream water batch and an upstream slurry batch crosses over a high point of the pipeline, the much greater specific gravity of the slurry can cause a so-called "slack flow" of the slurry in the downgrade portion of the pipeline following the high point if the back pressure acting on the slurry is insufficient to counteract the static head of the slurry at the interface. In such an instance, the slurry ceases to completely fill the pipeline. Instead, it occupies a reduced, say 50%, cross-section of the pipeline only. Since the slurry throughput remains constant, the flow velocity of the slurry in the areas in which slack flow occurs is correspondingly increased. This increased flow velocity causes an abrasion of the pipeline wall and, depending on the type of suspended solid and the slack flow velocity, can lead to pipeline damage in a relatively short period of time, sometimes in as little as a few hours unless the condition is rectified.

The obvious solution to reducing pipeline damage from slack flow is to protect and reinforce the pipeline walls where slack flow may occur. This could be accomplished by increasing the pipeline thickness or lining the pipeline with rubber, polyurethane, or similar materials. The problem with the obvious solution is that it is costly. Furthermore, the inevitable failure of the pipeline, the resulting need for an expensive shut down of the pipeline, and the necessary pipeline repairs, often at remote and almost inaccessible locations, are only postponed.

SUMMARY OF THE INVENTION

Accordingly, the present invention provides the apparatus and method to temporarily generate a back pressure in the pipeline during periods in which slack flow would otherwise occur to reduce abrasive damage to the pipeline. This is done by increasing the flow resistance encountered by the liquid and the slurry downstream of a pipeline high point and the adjoining downgrade portion of the pipeline in which slack flow would occur.

The increased flow resistance generates a back pressure which must be sufficiently large so that the pressure at all points in the pipeline is above atmospheric pressure.

Generally speaking, the energy level of a liquid flowing in a pipeline depends upon the liquid's static head (also called the elevation head), its kinetic energy due to its flow velocity, and its fluid pressure head. The total must be sufficiently large to overcome the flow resistance encountered by the liquid downstream of the point under consideration. When two liquids are batched in the pipeline the latter two energy components of the two liquids are substantially equal. However, if the liquids have different specific gravities, their respective static heads may vary widely.

As above discussed, the slurry may have a specific gravity which can exceed that of water by a factor of as much as 2. Accordingly, the static head of a column of slurry may be 2 times as great as for the same column of water. Likewise, the flow resistance of water is much less than for slurry. The two effects acting individually or in combination can result in the energy level exceeding the friction resistance when the slurry following the water-slurry interface is located downstream of a pipeline high point. The increased static head of the (upstream) slurry accelerates the (downstream) water if the friction resistance or back pressure is too low. If such a condition exists, both the slurry and water downstream of the high or controlling point are accelerated. Since the input into the pipe is normally constant, particularly for slurry pipelines which typically employ constant displacement pumps, the acceleration of the downstream volume causes the formation of a void space downstream of the high or controlling point. Consequently, the slurry occupies less than the full cross section of the pipe. Thus, a slack flow takes place, that is a flow which does not occupy the full cross section of the pipe.

Under slack flow conditions, the same volume of slurry in the pipeline continues to flow. Since that flow now occupies a lesser cross section of the pipeline, it necessarily flows faster. This faster flow accelerates the slurry particles and can impart to them sufficient kinetic energy so that they are able to pierce a normally substantially stationary boundary layer adhering to the inner pipeline walls with sufficient energy to abrade the pipe wall. (The particles are frequently highly abrasive). The deterioration of the pipe can become rapid and can in the worst case lead to pipe failure in a matter of days.

The present invention avoids slack flow and the resulting pipe damage by temporarily increasing the back pressure downstream of the point where slack flow may occur, that is downstream of a pipeline high point and the ensuing downgrade. The back pressure that is generated must be sufficiently large so as to compensate for the difference between the static head of the slurry and the water and the lower friction resistance of the water. This required back pressure varies with the location, that is with the relative elevation between the high point and the interface. Ideally, therefore, the generated back pressure is varied so that it is raised and lowered as the interface location changes to minimize energy losses in the pipeline caused by the increased flow resistance. This is accomplished by providing means for varying the flow resistance such as a number of serially arranged reduced-diameter orifices which can be selectively placed into or removed from the pipeline flow at a flow control station.

In accordance with the present invention, this is accomplished by sensing the pressure at a high point, generating a pressure responsive signal, and using the signal to control and vary the total flow resistance generated in the pipeline at the control station. Preferably this is accomplished by mounting stationary orifices in a plurality of pipeline loops and selectively actuating strategically placed valves to pass the pipeline flow through the loops and the flow restrictor or restrictors placed therein as required to prevent slack flow. Similarly, the valves are selectively actuated to bypass the pipeline flow away from the loops and the flow restrictors therein when the pressure in the pipeline approaches a value at which damage to the pipeline could occur. In a preferred embodiment, the system is arranged so that the pressure in the pipeline at the high point is kept above atmospheric pressure, the pressure below which slack flow first begins.

BRIEF DESCRIPTION OF THE DRAWINGS

FIG. 1 is a graphical representation of the elevation profile of a pipeline, showing relative high points.

FIG. 2 is an expanded view of one of the relative high points shown in FIG. 1 and shows a slack flow condition.

FIG. 3 is a cross-section of the pipeline at a point upstream of the water-slurry interface during the slack flow condition.

FIG. 4 is a cross-section of the pipeline at a point downstream of the water-slurry interface.

DESCRIPTION OF THE PREFERRED EMBODIMENT

Figure 5:
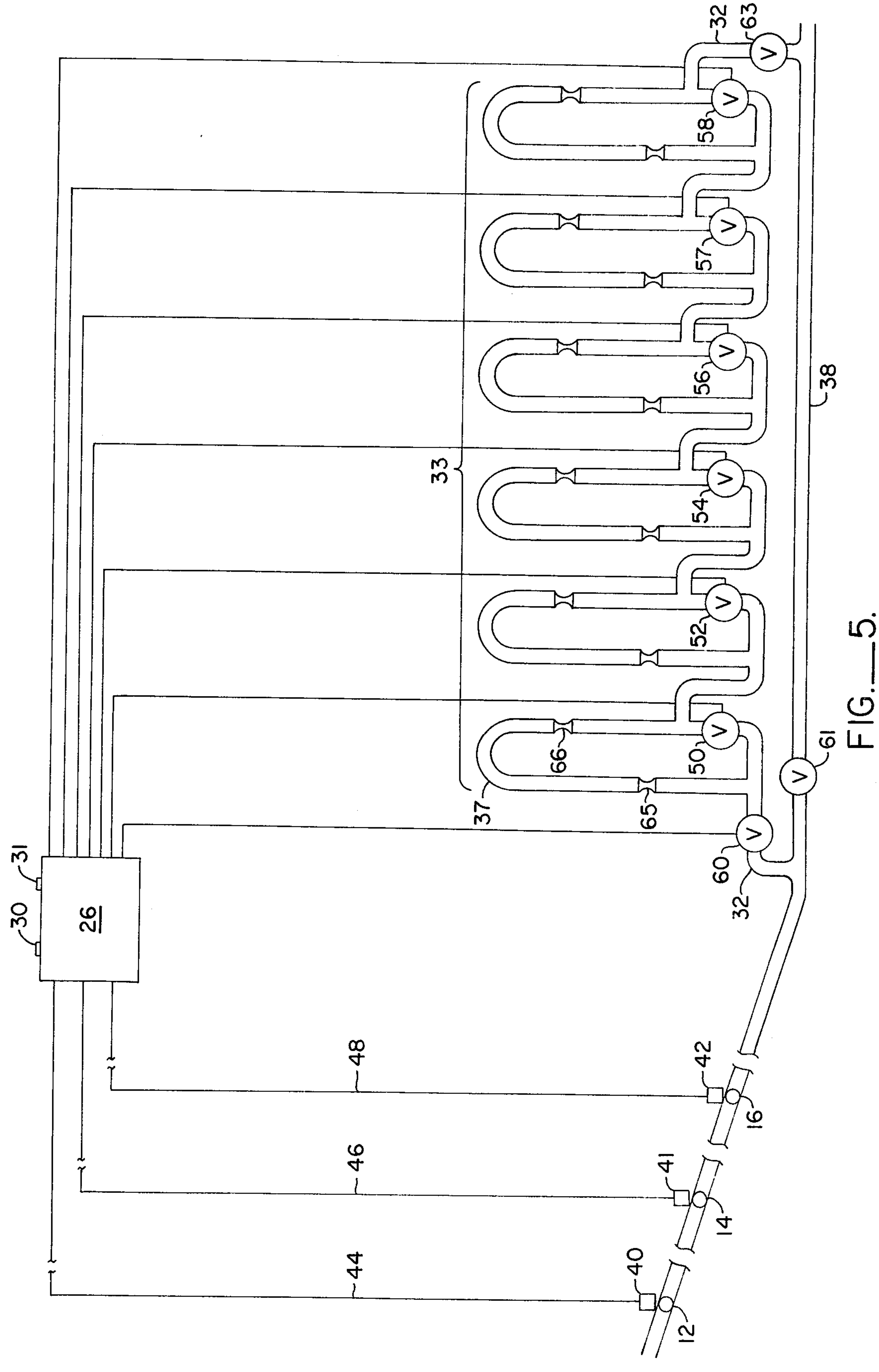
FIG. 5 is a schematic illustration of the back pressure control system.

The elevation of a slurry transport pipeline typically varies as illustrated graphically in FIG. 1. The pump station 10 is located at the concentrate production facility, such as a coal or iron mine, and is the inlet station on the pipeline. An outlet or recovery station 20 is typically located near convenient sources of use, further processing, or transportation, such as a power plant, steel mill, or railhead. Between the pump inlet station 10 and the recovery station 20, the slurry transport pipeline traverses terrain of various elevations, as represented by the elevation profile 22 of the pipeline.

Slurry pipelines are designed to adequately transport the slurry when the production facility of the concentrate is operating at its peak capacity. Typically, for example, mines do not reach full capacity until several years after mining has first begun. In designing a slurry pipeline, the pump size and pipeline size are selected based upon this estimated peak capacity.

Because it is not possible to provide the peak amount of solids, e.g. coal or ore, during the first few years of operation of the pipeline, the pipeline cannot be operated in an all slurry mode. The flow in slurry pipelines cannot normally be stopped because the solid particles would settle out at low points in the pipeline, be very difficult to displace, and may thus plug the pipeline. Thus, it is desirable to operate the pipeline continuously in a batch mode. In such operation, slurry is pumped through the pipeline for a period of time, usually several hours. This batch of slurry is then followed by a batch of carrier fluid, typically water, which is pumped for an additional period of time. By alternating the batches between slurry and water, the pipeline system is operated continuously. However, it is this batching which creates the slack flow problem and the resulting deterioration of the pipeline at certain locations as previously discussed.

The slack flow problem occurs predictably in the vicinity just downstream of relatively high elevation points of the pipeline. The primary indicator of impending slack flow is the pressure within the pipeline at the relative high points after the water-slurry interface has passed those high points. If the pressure within the pipeline approaches below atmospheric pressure at a high point, the pipeline will soon be less than full at a point just downstream of the high point, and thus the velocity of flow will begin to increase in that region. This increased velocity of the slurry produces an excessive abrasive effect on the pipeline.

Three relatively high points along the pipeline represented in FIG. 1 where slack flow is likely to occur are shown as stations 12, 14 and 16. It is particularly after the interface between a batch of water and a following batch of slurry passes any of these potential slack flow stations that slack flow is likely to occur. Thus, as shown in FIG. 2, a water-slurry interface 24 has passed relative high point 12. Downstream of the interface, the pipeline contains a water batch. Upstream of the interface, the pipeline contains a slurry batch. Because the slurry has a specific gravity higher than that of water and the water has a lower flow resistance, the flow driving force may exceed the friction resistance to flow. When the friction resistance to flow downstream of the relative high point is less than the driving forces for flow, the downstream flow will accelerate, creating slack flow. This impending slack flow is preceded by a drop of pressure to below atmospheric pressure within the pipeline at the relative high point upstream of the interface. Thus, when pressure transducer 40 senses a pressure of below atmospheric pressure at relative high point 12, slack flow has commenced or is imminent. When slack flow is fully developed, a region of the pipeline just downstream of the high point will be only partially full of slurry, as shown in FIG. 3. The pipeline will be completely full of water, however, at a point downstream of the interface, as shown in FIG. 4. Because the volumetric rate of flow is essentially constant in slurry pipelines utilizing constant displacement pumps, the velocity of the concentrate particles in the slurry will increase proportionately to the decreasing cross-sectional area of the pipeline occupied by the slurry. The high velocity concentrate particles will penetrate the stationary boundary layer of fluid adjacent to the pipe wall and abrade the pipeline.

The present invention reduces the problem of slack flow by sensing the pressure at the potential slack flow stations and restricting the flow at a downstream station 18 to raise the back pressure within the pipeline. By raising the fluid pressure within the water batch, the slurry is prevented from accelerating the water batch down the pipeline. Station 18 is a variable choke station which is responsive to the pressures sensed at stations 12, 14 and 16 and which is operated by control box 26.

A system for the control of back pressure is shown in FIG. 5. Pressure transducers 40, 41 and 42, placed on the pipeline at stations 12, 14 and 16, respectively, sense the pressure within the pipeline at those locations and produce an electrical signal, such as a voltage, proportional to the sensed pressure. The voltage output of these transducers is transmitted by a suitable means, such as transmission lines 44, 46, and 48, to a control box 26. Alternatively, the output of the transducers could be transmitted by means of radio transmission. This latter mode of transmission is especially suitable when the pressure sensing stations are located in geographically remote areas.

The flow restricting device in the preferred embodiment consists of a variable choke 33 located at a station downstream of the pressure sensing stations. Preferably, the variable choke consists of several stages of a bypass pipe 32 connected to the main pipeline 38. Each of the stages is a vertical loop of pipe containing orifices to restrict the flow and thus dissipate energy. Passing the flow through a flow restrictor, such as an orifice, results in an increase in upstream fluid pressure. Each of the stages contains a valve, such as valve 50 shown in the first stage 37.

In operation, each of the pressures sensed by the transducers is compared to predetermined high and low values of pressure to control the switching of the valves within the stages of the variable choke and thus to divert the flow through the loops and the orifices therein. Typically, the predetermined low value of pressure is chosen to be slightly above atmospheric pressure, the pressure at which slack flow first begins. The high value of pressure is determined by the maximum pressure allowable within the pipeline. The predetermined high and low values of pressure are adjustable within the control means 26 by suitable adjusting mechanisms 30 and 31 respectively. The adjusting mechanism may be any suitable electrical device, such as a potentiometer, which provides a variable output voltage in response to the manual movement of a knob. Thus, as the pipeline experiences wear over a period of years and the maximum pressure the pipeline can withstand decreases, the predetermined high vlaue of pressure can be correspondingly decreased. Thus, the pressure in the pipeline is increased or decreased as required.

Within the control box 26, each of the pressures sensed by the respective pressure transducers 40, 41 and 42, located at the potential slack flow stations, is continuously compared to the predetermined high and low values. This comparison of pressure is accomplished by suitable electrical circuitry, such as an analog comparator circuit, which is capable of determining the difference between the voltage outputs of the pressure transducers and the voltage outputs of the potentiometers.

In normal operation, when the slack flow condition does not exist, valves 50, 52, 54, 56, 57 and 58 are open, valve 61 is closed, valves 60 and 63 are open, and the slurry passes directly through the pipeline 32 avoiding the variable choke 33. When one of the sensed pressures falls below the preset low value, the control box 26 provides an electrical impulse to actuators which close valve 50 so that the flow is diverted through the first pipe loop of the variable choke, and the orifices 65 and 66 within that pipe loop. The diversions of flow through the orifices of the first loop dissipates energy and raises the upstream fluid pressure. If the pressure upstream at one of the potential slack flow stations remains below the preset low value for a predetermined period of time, the control box 26 signals an actuator to close valve 52 so that the flow is now diverted through two stages of the variable choke.

Similarly, if one of the sensed pressures exceeds the preset high value, the control box 26 signals an actuator to open the proper valve and thus redirect the flow away from one of the stages and back to the main pipeline. If the pressure upstream at one of the potential slack flow stations remains above the preset high value for a predetermined period of time after the flow has been redirected away from one of the pipe loops the control box signals the proper actuator to redirect the flow away from an additional pipe loop. The sequence of adding and deleting pipe loops is normally varied among the individual pipe loops so as to effect equal wear of all of the orifices.

The number of pipe loops and the size and construction of the orifices will depend upon the design requirements of the pipeline and the material to be transported therein.

The control box 26 contains suitable circuitry for continuously comparing the sensed pressures to the predetermined high and low values, and for signalling the actuators which control the valves within the variable choke.

The use of the above-described pressure control system to operate a variable choke within predetermined high and low values of pressure eliminates slack flow without imposing excessive back pressure within the pipeline. Thus, excessive flow velocities do not develop at potential slack flow areas and thus there is no resultant excessive wear on the pipeline at those areas.

While the preferred embodiment of the present invention has been illustrated in detail, it is apparent that modifications and adaptations of that embodiment will occur to those skilled in the art. However, it is to be expressly understood that such modifications and adaptations are within the sphere and scope of the present invention.

What is claimed is:

1. In a method for operating a pipeline traversing terrain at varying elevations including at least one relative high point of the pipeline followed by a pipeline downgrade portion, the method including the steps of feeding batches of liquid with differing specific gravities into an upstream end of the pipeline, pressurizing the liquid sufficiently so as to flow it through the pipeline to the downstream end thereof and so that the flowing liquid substantially fills the entire cross-section of the pipeline, and withdrawing the liquid from the downstream end at substantially the same rate at which the liquid is fed into the upstream end of the pipeline, the improvement comprising the step of preventing the liquid from flowing in the downgrade portion at a speed significantly greater than an average flow speed of the liquid throughout the full length of the pipeline by generating a sufficient back pressure in the liquid flowing in said downgrade portion when an interface between a first, downstream batch of liquid having a relatively lesser specific gravity and a second, upstream batch of liquid having a relatively larger specific gravity is in the vicinity of the downgrade portion so that the liquid flowing in said downgrade portion flows at the average flow speed.

2. The method of claim 1 including the step of sensing the liquid pressure proximate the high point, and wherein the step of generating a back pressure is performed when the sensed liquid pressure falls below a predetermined value.

3. A method according to claim 2 wherein the step of generating the back pressure is performed whenever the sensed pressure is at or below atmospheric pressure.

4. A method according to claim 1 wherein the step of generating the back pressure comprises the step of increasing the flow resistance encountered by the liquid at a point downstream of the downgrade portion.

5. A method according to claim 1 including the step of varying the generated back pressure.

6. A method according to claim 4 wherein the step of increasing comprises the step of reducing the effective diameter of the pipe downstream of the downgrade.

7. A method of operating a pipeline for transporting a first liquid between an upstream end and a downstream end of the pipeline at or below the design capacity of the pipeline over terrain of varying elevation comprising the steps of alternatingly stocking the upstream end of the pipeline with the first liquid and then with a second liquid, the liquids having differing specific gravities; pressurizing the stocked liquids sufficiently to overcome static pressure heads due to elevational differences over the length of the pipeline and due to friction losses of the liquids flowing through the pipeline and to maintain the entire cross-section of the pipeline substantially filled with liquid; sensing the pressure of the liquids in the pipeline at at least one relative high point of the pipeline; and generating a back pressure in the pipeline at a point downstream of the high point when an interface between the liquids is in the vicinity of the high point and the liquid pressure at the high point drops below a predetermined value; whereby an increased liquid velocity downstream of the high point and a resulting partial filling of the pipeline with liquid downstream of the high point are prevented, and resulting abrasion of the pipeline by the liquid is reduced.

8. A method according to claim 7 wherein the step of generating the back pressure includes the step of varying the generated back pressure.

9. A method according to claim 7 wherein the step of generating the back pressure is performed when the interface is in a downgrade portion of the pipeline that is immediately downstream of the high point, and when the liquid downstream of the interface has a relatively lesser specific gravity and the liquid upstream of the interface has a relatively greater specific gravity.

10. A method according to claim 7 including the step of sensing the pressure of the liquid in the pipeline at a plurality of spaced apart high points of the pipeline.

11. A method according to claim 7 wherein the step of generating a back pressure comprises the step of increasing the flow resistance encountered by the liquid at a point downstream of the high point.

12. A method according to claim 11 wherein the step of increasing the flow resistance includes the step of placing a reduced diameter orifice in the liquid flowing in the pipeline.

13. A method according to claim 12 including the step of varying the generated back pressure by providing a plurality of serially arranged orifices, and selectively increasing or decreasing the number of orifices placed in the liquid flow.

14. A method of transporting through a pipeline a slurry having a relatively high specific gravity and including suspended abrasive particles at a capacity below the design capacity of the pipeline, the pipeline extending over terrain of varying elevation and including at least one relatively high point in the pipeline followed by a downgrade portion of the pipeline, the method comprising the steps of pressurizing the slurry sufficiently to pump it through the pipeline from an upstream end to a downstream end at a sufficiently low flow rate so that the average speed of the slurry permits the formation of a substantially stationary liquid boundary covering the interior wall of the pipeline to reduce abrasion of the pipeline wall by flowing particles; intermittently substituting a liquid for the slurry being pumped through the pipeline, the liquid having a lesser specific gravity than the slurry; sensing the liquid pressure at the high point at least when an interface between a downstream liquid batch and an upstream slurry batch is at or downstream of the high point; and increasing the flow resistance encountered by the liquid and the slurry at a control station downstream of the downgrade portion when the sensed pressure at said high point is at or below a predetermined value sufficiently to increase the sensed pressure above the predetermined value; whereby an increase in the flow rate of the slurry downstream of the high point and a penetration of the protective boundary by slurry particles are prevented and a resulting abrasion of the pipeline wall by the particles is reduced.

15. A method according to claim 14 including the step of varying the increased flow resistance as a function of the sensed pressure at the high point.

16. A method according to claim 15 wherein the step of varying comprises the step of varying the flow resistance in incremental steps.

17. A method according to claim 14 including the step of terminating the step of increasing the flow resistance before said interface passes the control station.

* * * * *